3,154,513
POLYAMIDES WITH IMPROVED FLOW PROPERTIES

Gerhard Illing, Neuleiningen, Pfalz, Fritz Hanusch, Ludwigshafen (Rhine)-Gartenstadt, and Karl Hagen, Ludwigshafen (Rhine), Germany, assignors to Badische Anilin- & Soda-Fabrik Aktiengesellschaft, Ludwigshafen (Rhine), Germany
No Drawing. Filed Nov. 17, 1959, Ser. No. 853,450
Claims priority, application Germany Nov. 22, 1958
5 Claims. (Cl. 260—31.8)

This invention relates to linear film-forming polyamides of which the flowability in the non-cutting working up in the hot-plastic condition is improved by the addition of long-chain dicarboxylic acid diesters.

The working up of polyamides, including polyurethanes, polyureas and the like in injection molding machines, extrusion presses, screw presses and similar machines takes place through the hot-plastic or fused-liquid state, i.e. at relatively high temperatures of about 200° to 350° C. Burning of the material on the hot walls often occurs. Shaped articles of such polyamides, even when the burns are only trivial, are slightly discolored and have dirty patches. Attempts are therefore made to keep the residence period of the plastic at the hot walls as short as possible. Substantial improvements have already been achieved by the observance of definite temperature and working conditions and by constructional alterations in the processing machines. The risk of thermal damage can be further reduced by increasing the flowability of the polyamides. Polyamides with improved flowability may moreover be worked up more economically because larger amounts can be worked up per unit of time.

To improve the sliding properties it has already been proposed to add to polyamides metal soaps, as for example aluminum stearate. Metal soaps, however, deteriorate the mechanical properties of the polyamide shaped articles prepared therewith. Especially the tensile properties at joints of injection moldings are considerably adversely affected.

It is an object of this invention to provide polyamides with improved flowability. Another object of this invention is to provide polyamides having improved thermal stability.

We have found that the said and further objects are attained by uniformly distributing in the polyamides small amounts of saturated pure aliphatic dicarboxylic acid diesters of high-molecular aliphatic monohydric alcohols and high-molecular aliphatic dicarboxylic acids. The advantageous mechanical properties of the polyamides, such as hardness, resistance to wear or tensile strength, are not affected by the additive.

The aliphatic dicarboxylic acid diesters are difficultly volatile compounds of liquid to waxy character of which the boiling points are not below 180° C. but as a rule are above 250° C. The diesters are practically incompatible with the polyamides and therefore have no plasticizing effect thereon. Suitable dicarboxylic acid diesters have 18 to 42 carbon atoms and are obtained by esterification of an aliphatic dicarboxylic acid, i.e., an alkane diacid with 4 to 18 carbon atoms with 2 mols of an aliphatic monohydric alcohol, i.e., an alkanol with 4 to 12 carbon atoms. For the term pure aliphatic reference is made to the structure of the said esters, i.e., the ester-forming dicarboxylic acids and alcohols are derived from the corresponding hydrocarbons by simple substitution with two carboxyl groups and one hydroxyl group respectively and therefore contain no other substituents or unsaturated linkages which would bring about a compatibility of the diesters with the polyamides or could cause a chemical reaction between the diesters and the polyamides. Suitable dicarboxylic acid diesters include the following: adipic acid di-(2-ethylhexyl) ester, adipic acid dinonyl ester, sebacic acid dioctyl ester, 1-octylnonane dicarboxylic acid di-isobutyl ester or 1-nonyloctane dicarboxylic acid di-(2-ethylhexyl) ester. Mixtures of these esters may also be used, for example an isomeric mixture of 2-methylglutaric acid di-isooctyl ester and adipic acid di-iso-octyl ester obtainable by carbonylation reactions. It is not important by what method the esters have been obtained, i.e. from acids, their anhydrides or halides. However, they must contain in the molecule the elements which are derived from the said alcohols and the said dicarboxylic acids.

The amount of the diester necessary for the improvement of the flow properties amounts to 0.05 to 1% by weight with reference to the weight of the polyamide. The favorable effect of the addition is evident in the case of all synthetic linear film-forming polyamides, especially polyamide homocondensates derived from diamines and dicarboxylic acids, as for example hexamethylene diamine adipate or suberate, or decamethylene diamine sebacate. The processing temperature with these polyamides is especially high, namely at 250° to 350° C. The addition is also effective in the case of condensates derived from lactams, for example polycaprolactam, polycapryllic lactam or polylauric lactam, which require a processing temperature between 200° and 280° C. The diesters may also be added with advantage to co-condensates derived from polyamide-forming substances, or to polyurethanes, which are to be worked up by non-cutting methods, for example in screw presses. By the term polyamide we understand high molecular weight film-forming synthetic compounds having a recurring amide group in the molecule.

Prior to the working up, it is preferable to prepare a mixture of the polyamide and the diester which is as homogeneous as possible by introducing the two components into a mixing apparatus. The small amount of the diester is taken up completely by the polyamide so that the outer appearance does not show the heterogeneity of the mixture. In the case of many screw machines, the two components may however be introduced separately into the sprue and the thorough mixing effected in the cold or moderately hot cylinder section.

Polyamides having an addition of diester according to this invention may be worked up especially advantageously in injection molding machines (screw), extruders or similar machines. The flowability of these mixtures is as a rule improved by more than 10% as compared with the same polyamides without the diester addition. The speed of working up can thereby be considerably increased. Furthermore the polyamides adhere scarcely at all to the hot walls so that burning of the material is substantially avoided and the degree of soiling is considerably reduced.

The following examples will further illustrate this invention but the invention is not restricted to these examples. The parts specified in the examples are parts by weight.

Example 1

0.2 part of an ester mixture consisting of 35% of 2-methylglutaric acid di-(2-ethylhexyl)ester and 65% of adipicacid di-(2-ethylhexyl)ester are added to 100 parts of a polyamide derived from adipicacid and hexamethylene diamine ($k$-value 73.7, softening point 262° to 263° C.) in a mixing machine. Mixing is carried on for half an hour at room temperature and a uniform mixture is obtained. The mixture is worked up in an extruder at 280° to 320° C. The flowability of the polyamide is improved by about 13.5% as compared with the same polyamide without the diester addition. The degree of soiling (determined as the quotient of square millimeters of dirty patches per square meter of surface of a flat test disc) is reduced by more than half as compared with the ester-free polyamide.

*Example 2*

100 parts of a polyamide derived from adipic acid and hexamethylene diamine (*k*-value 74.3, softening point 260° to 263° C.) are mixed with 0.3 part of di-iso-octyl adipate and 1 part of titanium dioxide. The mixture is worked up in a screw extruder at 260° to 340° C. A pure white polyamide is obtained. As compared with a polyamide without ester addition, the color is paler and purer. The flowability is improved by 11.2%.

*Example 3*

100 parts of polycaprolactam with a *k*-value of 74.2 and a softening range of 216° to 218° C. are well mixed with 0.15 part of dinonyl adipate at room temperature and then worked up in a screw extruder at 250° to 280° C. A pure polycaprolactam with the same viscosity and the same *k*-value is obtained but with a flow power which is improved by 14% as compared with that of the same polycaprolactam without the addition of the ester.

*Example 4*

An intimate mixture is prepared from 100 parts of polycaprolactam with a *k*-value of 73.8 and a softening range of 216° to 218° C., 0.3 part of 1-octylnonane dicarboxylic acid di-iso-octyl ester and 0.2 part of disodium hydrogen phosphite in a stirring blade mixer and then in a double-arm disc kneader at 230° to 260° C.

A pale polycaprolactam is obtained of which the viscosity and *k*-value are unchanged but which has a flowability improved by 34% as compared with the same polycaprolactam without the addition of ester.

For example by working up the untreated material in an injection molding machine there are obtained in 3 minutes and 0.8 second, 10 injection moldings having a weight of 25 grams each. With the same polyamide having a content of the dicarboxylic acid ester there are obtained under otherwise identical conditions 10 injection moldings of 25 grams in 1 minute and 10 seconds.

The addition of 0.3 part of 1-octylnonane dicarboxylic acid di-isobutyl ester produces an improvement of the flowability by 20 to 21%.

*Example 5*

100 parts of a polyamide derived from adipic acid and hexamethylene diamine (*k*-value 71.2, softening range 256° to 258° C.) are mixed in a stirring blade mixer with 0.3 part of 1-octylnonane dicarboxylic acid di-(2-ethylhexyl)ester and 0.2 part of disodium hydrogen phosphite and then worked up in a double-arm disc kneader at 260° to 290° C. From this polyamide it is possible to prepare per unit of time, by working up by injection molding, 14 to 15% more shaped articles than from the same polyamide without the addition of the ester.

We claim:

1. A composition comprising as the major, essential component thereof a synthetic, linear polyamide from the group consisting of a saturated aliphatic acid and saturated aliphatic diamine polycondensed together into a linear polyamide and a lactam polycondensed into a linear polyamide, and 0.05% to 1% by weight, based on said polyamide, of the diester of a saturated, aliphatic dicarboxylic acid having 4–18 carbons and a saturated, aliphatic monohydric alcohol having 4–12 carbons with the further proviso that said diester has a total of 18–42 carbons.

2. A composition comprising as the major, essential component thereof a synthetic, linear polyamide of hexamethylene diamine and adipic acid, and 0.05% to 1% by weight, based on said polyamide, of the diester of a saturated, aliphatic dicarboxylic acid having 4–18 carbons and a saturated, aliphatic monohydric alcohol having 4–12 carbons with the further proviso that said diester has a total of 18–42 carbons.

3. A composition comprising as the major, essential component thereof polycaprolactam, and 0.05% to 1% by weight, based on said polycaprolactam, of the diester of a saturated, aliphatic dicarboxylic acid having 4–18 carbons and a saturated, aliphatic monohydric alcohol having 4–12 carbons with the further proviso that said diester has a total of 18–42 carbons.

4. A composition comprising as the major, essential component thereof a synthetic linear polyamide of hexamethylene diamine and suberic acid, and 0.05% to 1% by weight, based on said polyamide, of the diester of a saturated, aliphatic dicarboxylic acid having 4–18 carbons and a saturated, aliphatic monohydric alcohol having 4–12 carbons with the further proviso that said diester has a total of 18–42 carbons.

5. A composition comprising as the major, essential component thereof a synthetic, linear polyamide of decamethylene diamine and sebacic acid, and 0.05% to 1% by weight, based on said polyamide, of the diester of a saturated, aliphatic dicarboxylic acid having 4–18 carbons and a saturated, aliphatic monohydric alcohol having 4–12 carbons with the further proviso that said diester has a total of 18–42 carbons.

References Cited in the file of this patent

UNITED STATES PATENTS

| | | |
|---|---|---|
| 2,124,315 | Ryan | July 19, 1938 |
| 2,265,119 | Coolidge | Dec. 2, 1941 |
| 2,350,851 | Wehr | June 6, 1944 |